US010238949B2

(12) United States Patent
Ploegman

(10) Patent No.: US 10,238,949 B2
(45) Date of Patent: Mar. 26, 2019

(54) SYSTEM AND METHOD FOR DISPLAYING A BASEBALL BATTER COUNT

(71) Applicant: Joe Martin Ploegman, Las Vegas, NV (US)

(72) Inventor: Joe Martin Ploegman, Las Vegas, NV (US)

( * ) Notice: Subject to any disclaimer, the term of this patent is extended or adjusted under 35 U.S.C. 154(b) by 0 days.

(21) Appl. No.: 15/656,395

(22) Filed: Jul. 21, 2017

(65) Prior Publication Data

US 2018/0021657 A1    Jan. 25, 2018

Related U.S. Application Data

(60) Provisional application No. 62/365,901, filed on Jul. 22, 2016.

(51) Int. Cl.
| | |
|---|---|
| *A63B 71/06* | (2006.01) |
| *G09G 5/02* | (2006.01) |
| *H04N 5/44* | (2011.01) |
| *H04N 5/445* | (2011.01) |
| *H04N 21/431* | (2011.01) |
| *H04N 21/81* | (2011.01) |
| *A63B 102/18* | (2015.01) |

(52) U.S. Cl.
CPC ...... *A63B 71/0669* (2013.01); *A63B 71/0622* (2013.01); *G09G 5/02* (2013.01); *H04N 5/4403* (2013.01); *H04N 5/44582* (2013.01); *H04N 21/4312* (2013.01); *H04N 21/4316* (2013.01); *A63B 2102/18* (2015.10); *G09G 2320/0666* (2013.01); *G09G 2340/14* (2013.01); *H04N 21/812* (2013.01); *H04N 21/8133* (2013.01); *H04N 2005/441* (2013.01); *H04N 2005/44521* (2013.01)

(58) Field of Classification Search
None
See application file for complete search history.

(56) References Cited

U.S. PATENT DOCUMENTS

| | | | | |
|---|---|---|---|---|
| 8,488,682 | B2* | 7/2013 | Chang | G06F 17/30796 375/240.25 |
| 8,606,090 | B2* | 12/2013 | Eyer | H04N 5/783 386/343 |
| 2008/0130997 | A1* | 6/2008 | Huang | G06K 9/3266 382/181 |
| 2008/0175486 | A1* | 7/2008 | Yamamoto | G06F 17/30796 382/206 |
| 2016/0172005 | A1* | 6/2016 | Oguchi | G11B 27/034 386/241 |
| 2017/0048591 | A1* | 2/2017 | Park | H04N 21/4858 |

OTHER PUBLICATIONS

JVC Overlays: https://web.archive.org/web/20160325043648/http://pro.jvc.com/prof/attributes/features.jsp?model_id=MDL102399 (Mar. 2016 capture date) (Year: 2016).*

* cited by examiner

*Primary Examiner* — Ryan M Gray
(74) *Attorney, Agent, or Firm* — Masuvalley & Partners

(57) ABSTRACT

A method for depicting a batter count box on a display is provided. The method includes the steps of employing a plurality of pixelated sections, with the plurality of pixelated sections including a pixelated balls section and a pixelated strikes section within the batter count box.

11 Claims, 7 Drawing Sheets

SYSTEM AND METHOD FOR DISPLAYING A BASEBALL BATTER COUNT

This application claims priority to U.S. Provisional Application Ser. No. 62/365,901, filed on Jul. 22, 2016, entitled "Baseball Count Box for Television Display," which is incorporated herein by reference in its entirety.

FIELD OF THE INVENTION

The present invention relates to the display of score and batter information. More particularly, it relates to a method for depicting a count box during a baseball game which employs non-textual depictions signifying the current ball and strike count on the batter.

BACKGROUND OF THE INVENTION

In baseball and softball, "count" refers to the number of balls and strikes the batter has accrued during his current appearance at the plate with the opposing pitcher. The count is generally announced and depicted on the scoreboard as a pair of numbers, for example, 3-1 (pronounced as "three and one," or, alternatively, "a three-one count"), with the first number by convention being the number of balls, and the second being the number of strikes the batter has accrued. To baseball fans watching a baseball game on television, the scoreboard is generally not visible when the camera broadcasting the game is communicating a video of the batter on the screen. Consequently, to keep fans updated on the current batter count, television broadcasters have depicted a count box upon the screen in which the batter is being shown during a turn at bat. Broadcasters, however, have chosen to employ text on the depicted count box to emulate the textual depiction generally used on ballpark scoreboards.

SUMMARY OF THE INVENTION

However, a significant problem is encountered by most viewers of televised baseball games where such text based count boxes are depicted for viewers. In order to place all the relevant information in such depicted count boxes, broadcasters use text and numbers to show the current score, the state of the batters who may be on base, concurrently with the current count that batter has accrued in attempting to hit pitches from the pitcher. Because of the small size of such super imposed count boxes the employment of text and numbers for all the information being provided can be a significant issue to viewers who wear corrective lenses. Viewers of a television screen from across a room can have significant problems seeing text and numbers from a distance. This can occur even where corrective lenses are being worn.

Consequently, some or all of the numbers and text depicted may not be viewable to a large number of television viewers. Further, the depiction of current scores, innings, balls, pitches, strikes, and other score keeping data of interest, in a small area of a depicted count box can be confusing to discern as to what text and numbers refer to what score data of interest. Such a use of text and numbers in this small space for many data points of interest also can require the reduction in font size of some or all of the text or numerals, which of course will make discerning such text harder for those who may wear corrective lenses.

As such, there is a continuing unmet need for an improvement in the manner in which count boxes depicted during baseball games on television are depicted. The discussion of the background to the invention included herein is included to explain the context of the invention. This is not to be taken as an admission that any of the material referred to was published, known or part of the common general knowledge as at the priority date of the claims.

In accordance with a first aspect of the invention, a method for depicting a batter count box on a display includes the steps of:

employing a plurality of pixelated sections, with the plurality of pixelated sections including a pixelated balls section and a pixelated strikes section within the batter count box.

In accordance with a second aspect of the invention, a method for depicting a batter count box on a display includes the steps of:

employing a plurality of pixelated sections, with the plurality of pixelated sections including:

a pixelated balls section arranged horizontally in the batter count box, the pixelated balls section including a first color; and a pixelated strikes section arranged vertically in the batter count box, the pixelated strikes section including a second color.

In accordance with a third aspect of the invention, a non-transitory machine readable storage medium has stored thereon a computer program for depicting a batter count box on a display. The computer program includes a routine of set instructions for causing the machine to perform the steps of:

employing a plurality of pixelated sections, with the plurality of pixelated sections including a pixelated balls section and a pixelated strikes section within the batter count box.

These and other features and advantages of the present invention will be appreciated from review of the following Detailed Description of the Preferred Embodiments, along with the accompanying figures in which like reference numerals are used to describe the same, similar or corresponding parts in the several views of the drawings.

Figure 1:
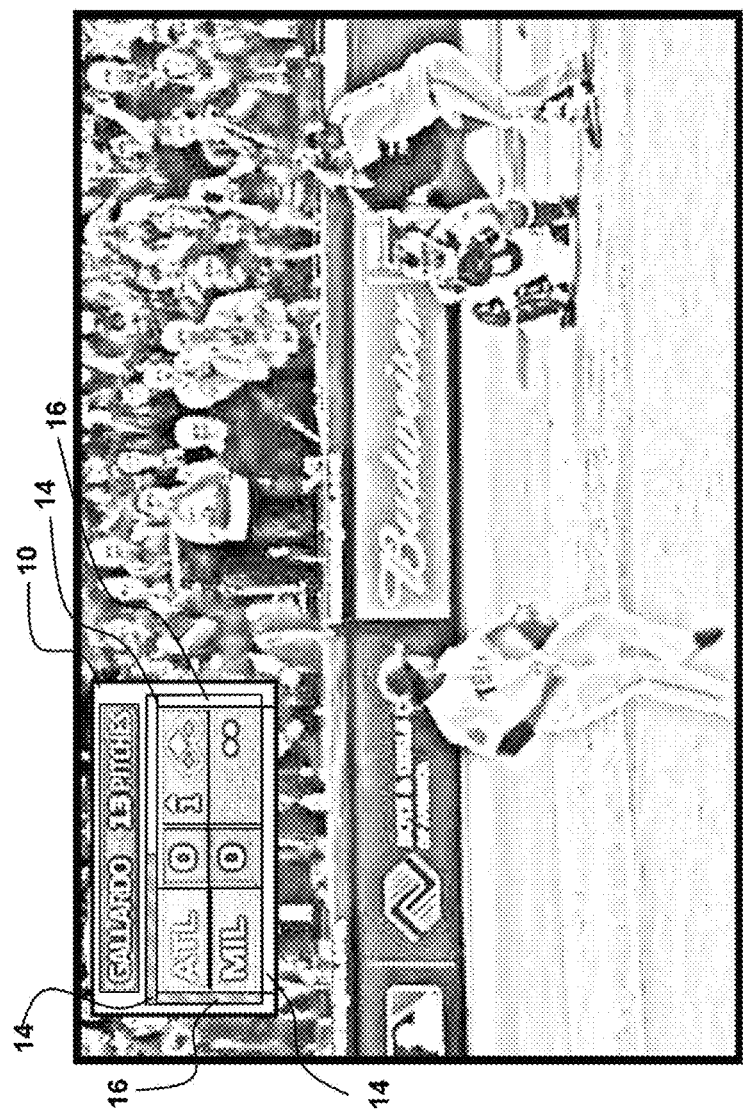
FIG. 1 shows a depiction of the count box herein super imposed in the pixelated video of a batter during a baseball game.
Figure 2:
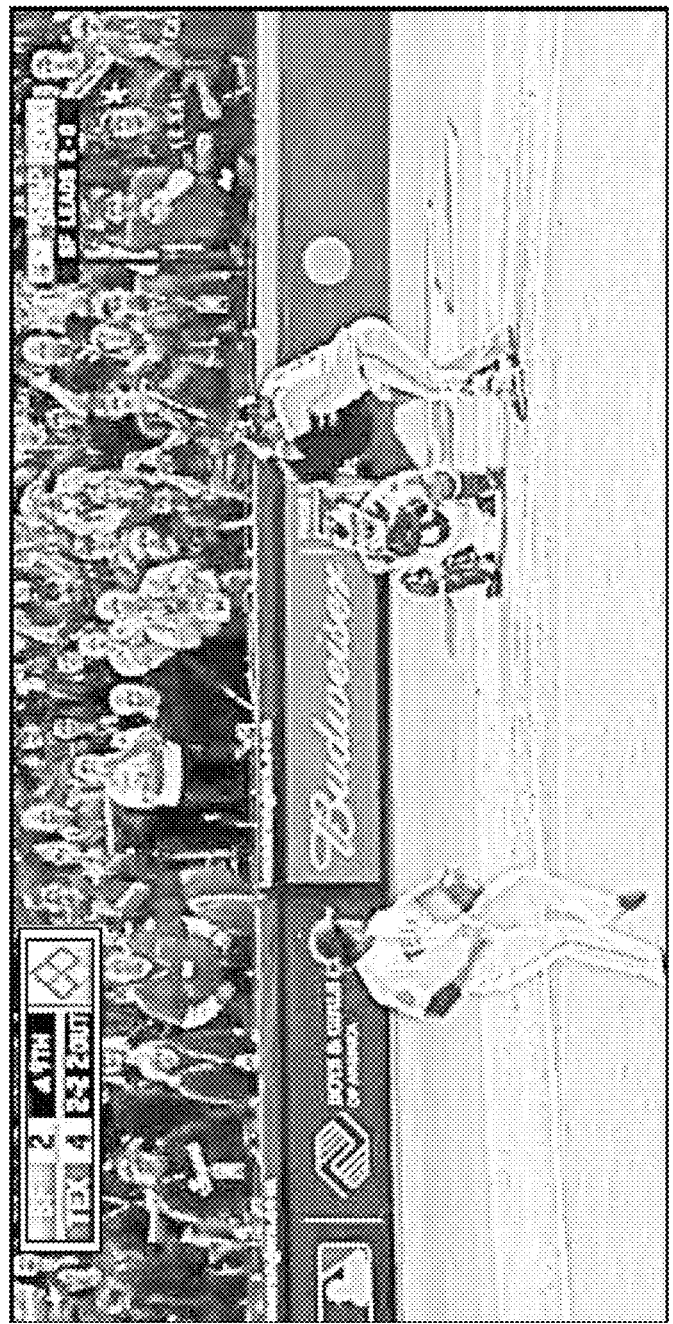
FIG. 2 shows a prior art depiction showing a current mode of depiction of a count box using solely text and numbers.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following description, for the purposes of explanation, numerous specific details are set forth in order to provide a thorough understanding of the baseball batter count display system and method that embodies principals of the present invention. It will be apparent, however, to one skilled in the art that the baseball batter count display system and method may be practiced without some of these specific details. Throughout this description, the embodiments and examples shown should be considered as exemplars, rather than as limitations on the baseball batter count display system and method. That is, the following description provides examples, and the accompanying drawings show various examples for the purposes of illustration. However, these examples should not be construed in a limiting sense as they are merely intended to provide examples of the baseball batter count display system and method rather than to provide an exhaustive list of all possible implementations of the baseball batter count display system and method.

The count box depiction system herein disclosed and described provides a solution to the shortcomings in prior art of count box depiction by broadcasters of baseball games. Through a novel system employing pixelated sections for both balls and strikes within the depicted count box, the system herein frees up space within the depicted count box of use with larger fonts for other data, or for insertion of advertising or logos in the open space. The system herein employs horizontally depicted pixilated sections of the count box, to depict the current ball count a batter has accrued. By depicting between one and three horizontally disposed pixelated areas in the count box, which may be colorized in a first color, the viewer of the game seeing the count box can instantly discern, without the need to read numbers or text, the number of balls the current batter has incurred during a turn at bat.

The strike count, which is also of continual concern to fans watching a batter during a baseball game, is also depicted in pixelated sections of the count box. In the case of strikes, a pair of vertically disposed areas within the count box are illuminated sequentially to show one or two strikes being accrued by the batter. These vertically disposed areas of pixelation would best be colorized in a different color than that of the horizontally disposed pixelated areas signifying balls noted above. By using colorized vertical and horizontal pixelated sections of the count box depicted, viewers will easily be able to discern, either close to the screen or at distances too far to read text, the current strike and ball count accrued by the batter. Further, as noted above, by eliminating the need to use text to show the number of strikes and balls accrued, the areas of pixelation saved within the count box can be employed for advertising or will allow for an increase font size for other data.

Such an improved count box depiction should allow easy discerning of the most important part of the count box, by eliminating the need for viewers to read text and numbers for the strike and ball count which is of most interest to game viewers. Such a system for depiction of the batter count should also free up space within the rest of the count box to allow for an increase in font size or for insertion of advertising within the freed space.

With respect to the above description, before explaining at least one preferred embodiment of the herein disclosed count box depiction system invention in detail, it is to be understood that the invention is not limited in its application to the details of construction and to the arrangement of the count box in the following description or illustrated in the drawings. The invention herein described is capable of other embodiments and of being practiced and carried out in various ways which will be obvious to those skilled in the art.

Also, it is to be understood that the phraseology and terminology employed herein are for the purpose of description and should not be regarded as limiting. As such, those skilled in the art will appreciate that the conception upon which this disclosure is based may readily be utilized as a basis for designing of other horizontal and vertical depictions. It is important, therefore, that the claims be regarded as including such equivalent construction and methodology insofar as they do not depart from the spirit and scope of the present invention.

In this description, the directional prepositions of up, upwardly, down, downwardly, front, back, top, upper, bottom, lower, left, right and other such terms refer to the device as it is oriented and appears in the drawings and are used for convenience only. Such terms are not intended to be limiting or to imply that the device has to be used or positioned in any particular orientation.

Now referring to the drawings in FIGS. 1-11, wherein similar components are identified by like reference numerals, there is seen in FIG. 1 a depiction of the count box 10 as it would be depicted on a pixelated video screen 12 such as a television, of a batter during a baseball game. As can be seen, there are three horizontally disposed pixelated areas 14, one of which is illuminated and colorized. Also shown, are two vertically disposed pixelated areas 16, where one is illuminated and colorized to signify one strike. In the count box 10 of the system herein, the ball and strike count is easily discerned without the need to see or read text or numerals such as is required in the prior art depiction of FIG. 2.

Figure 3:
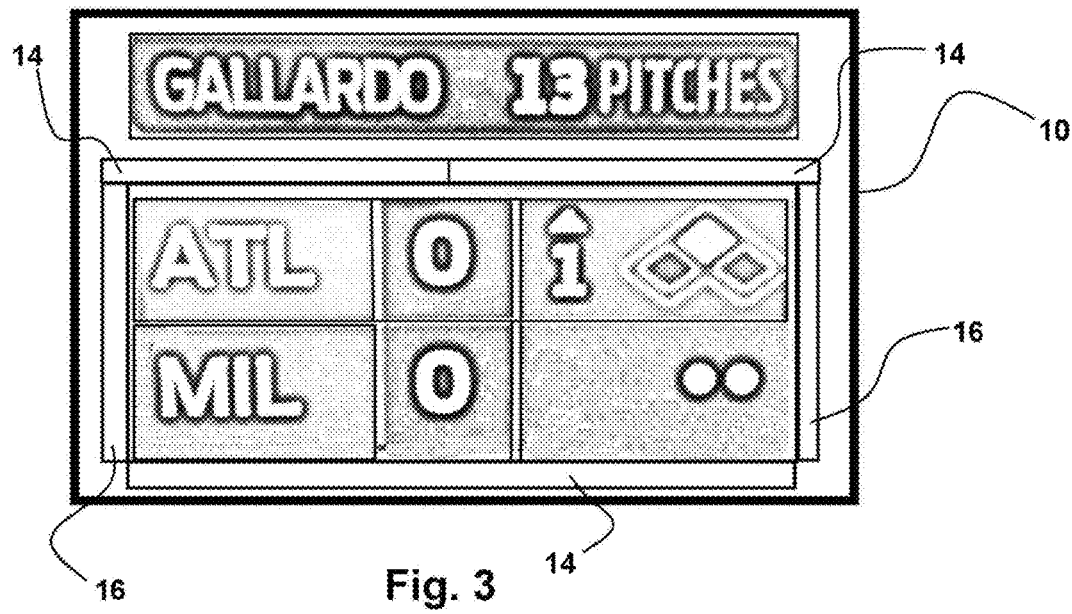
FIG. 3 is a depiction of the count box of the method herein, showing three horizontally disposed pixelated sections signifying balls, and two vertically disposed pixelated sections signifying strikes.

Shown in FIG. 3 is the count box 10 of the method of depiction herein. As can be easily seen, there are three horizontally disposed pixelated sections 14 signifying balls. As can also be easily seen, there are two vertically disposed pixelated sections 16 for signifying strikes.

Figure 4:
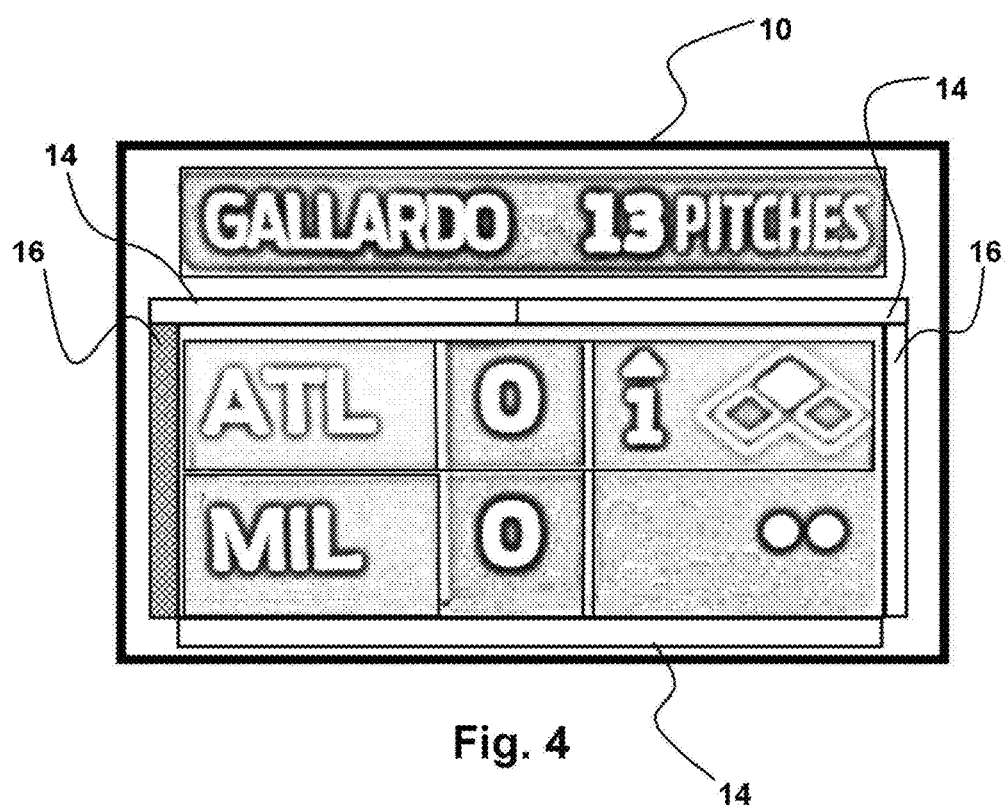
FIG. 4 shows the count box of FIG. 3 depicting a single strike in a first horizontally disposed pixilated section.
Figure 5:
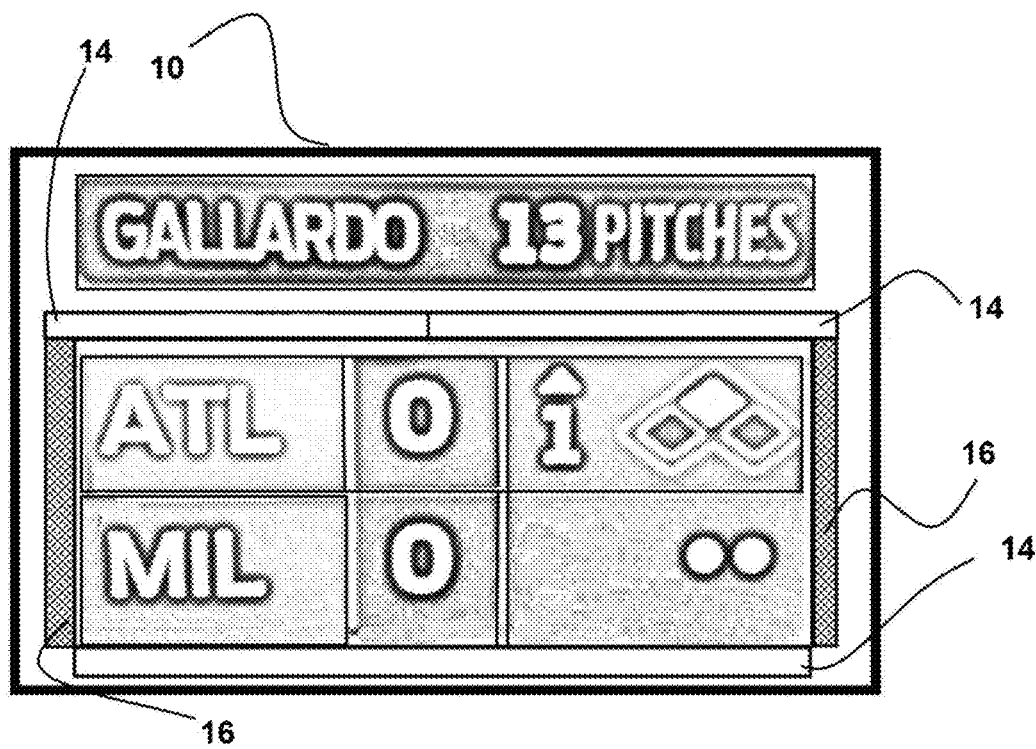
FIG. 5 depicts the count box of FIG. 4 wherein both of two pixilated vertically disposed sections are colorized to signify two strikes.
Figure 6:
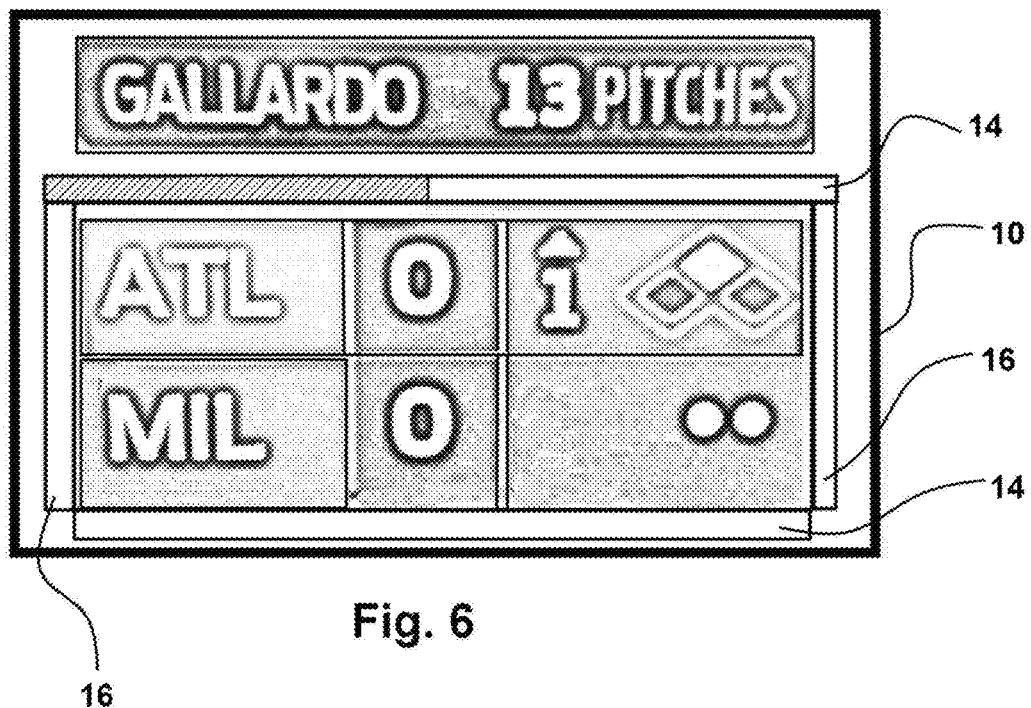
FIG. 6 depicts the count box of FIG. 3 showing a first of three horizontally disposed pixilated sections colorized to signify a single ball being accrued by a batter.

In FIG. 4 the count box of FIG. 3 is shown where a first vertically disposed pixelated section 16 is illuminated and colorized to signify one strike. FIG. 5 shows the count box of FIG. 4 wherein both of two pixelated vertically disposed sections 16 are illuminated and colorized to signify two strikes. In FIG. 6 is shown the count box 10 of FIG. 3 showing a first of three horizontally disposed pixelated sections 14 colorized and illuminated to signify a single ball being accrued by a batter.

Figure 7:
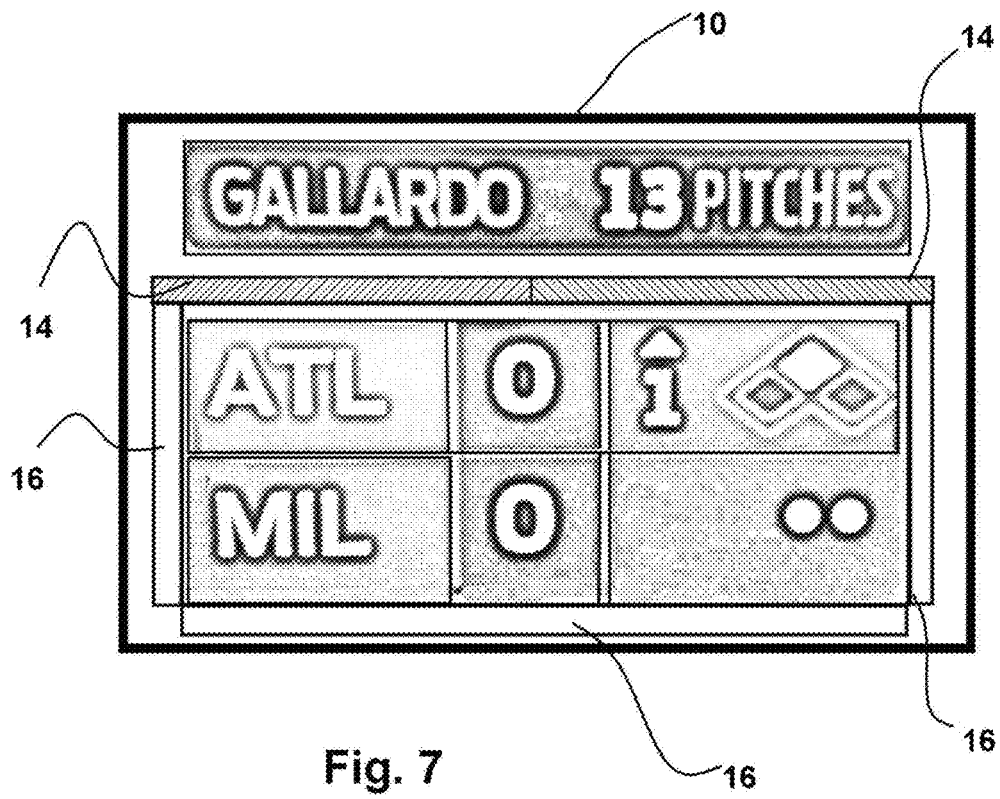
FIG. 7 shows the count box as in FIG. 6, wherein two of the three horizontally disposed pixelated sections are illuminated and colorized to show the accrual of two balls by a batter.
Figure 8:
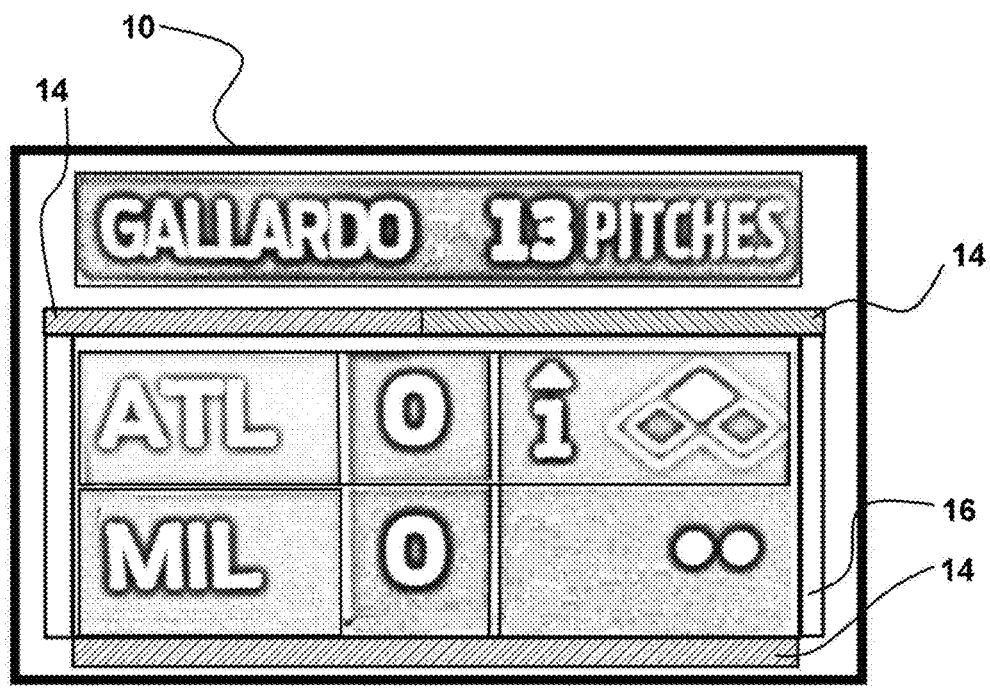
FIG. 8 depicts the count box of FIGS. 5-6 showing all three horizontally disposed pixelated sections being illuminated and colorized to show the accrual of three balls by a batter.
Figure 9:
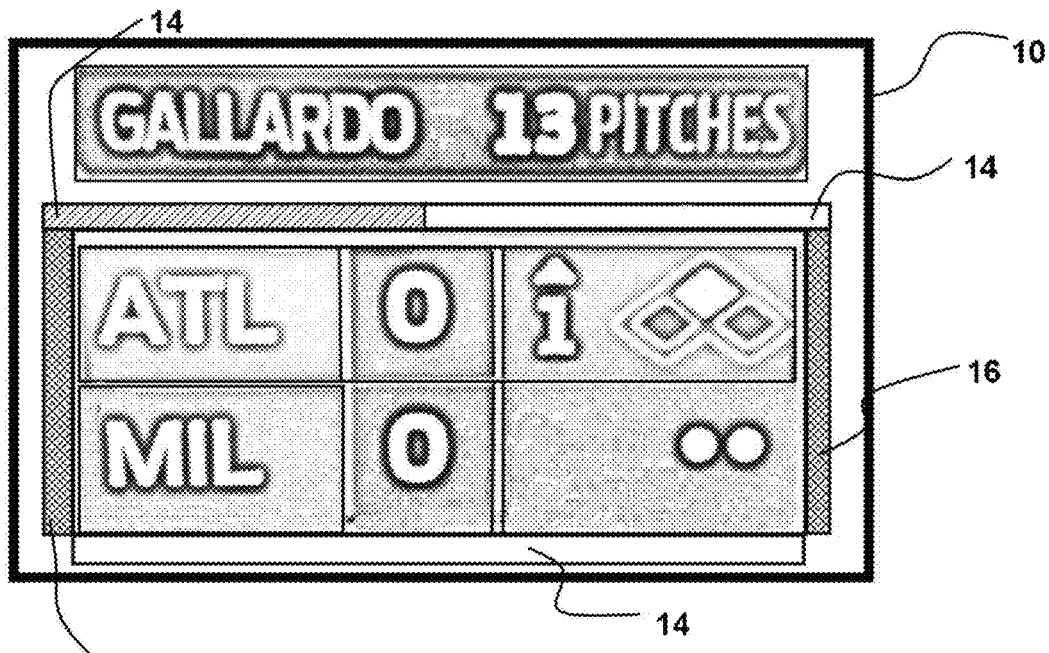
FIG. 9 depicts the count box herein showing that one ball and two strikes have been accrued by a batter.

Shown in FIG. 7 is the count box as in FIG. 6, wherein two of the three horizontally disposed pixelated sections 14 are illuminated and colorized to show the accrual of two balls by a batter. In FIG. 8 there is shown the count box 10 of FIGS. 6-7 showing all three horizontally disposed pixelated sections 14 being illuminated and colorized. This signifies that three balls have been incurred by a batter. Shown in FIG. 9 the count box 10 of the system herein, has one horizontally disposed pixelated section 14 illuminated and colorized to signify one ball has occurred. Also shown are the two vertically disposed pixelated sections 16 being illuminated and colorized to signify that two strikes have been accrued by a batter.

Figure 10:
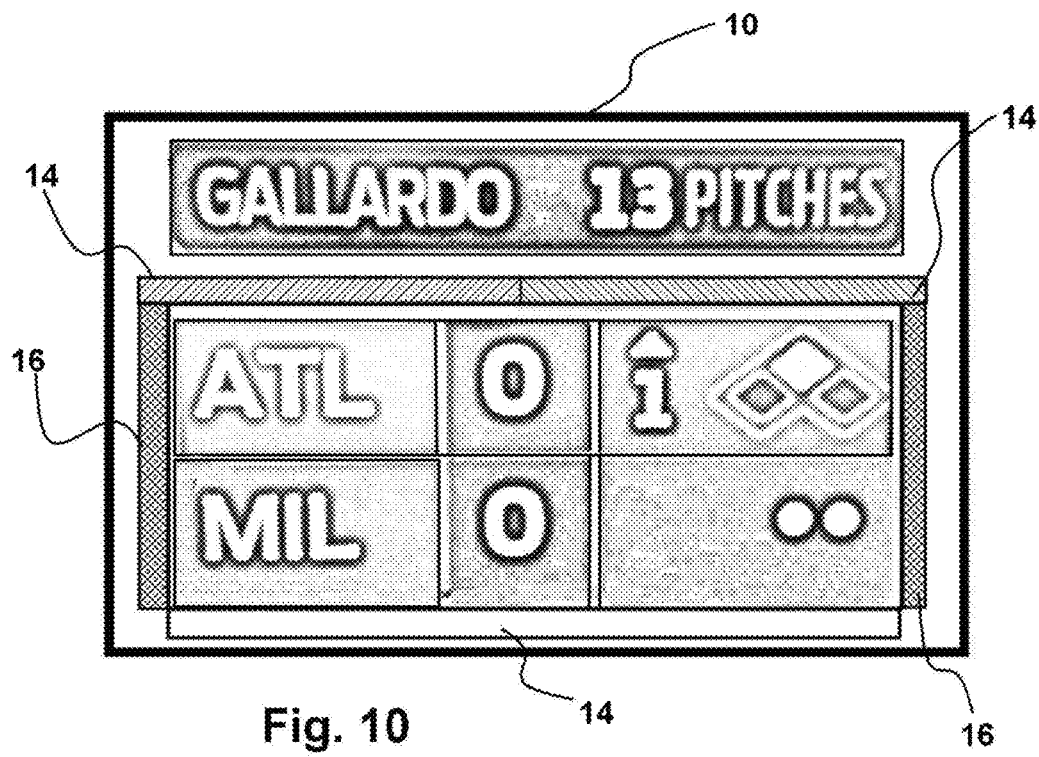
FIG. 10 shows the count box herein and illuminates two of the horizontally disposed pixelated sections and two of the vertically disposed pixelated sections to signify the batter has accrued two balls and two strikes.
Figure 11:
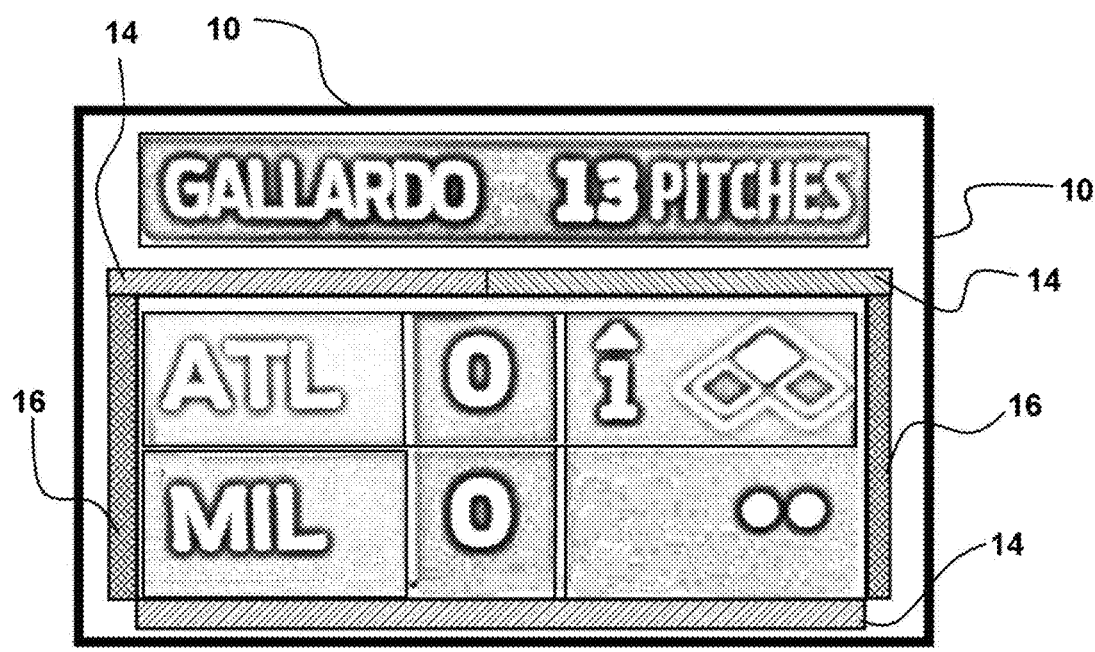
FIG. 11 shows the count box of the method herein where all of the horizontally disposed pixelated sections and vertically disposed pixelated sections are illuminated and colorized to show the batter has incurred a full count during a turn at bat.

In FIG. 10 the count box 10 herein disclosed has two of the horizontally disposed pixelated sections 14 and two of the vertically disposed pixelated sections 16 illuminated and colorized. This signifies that the batter has accrued two balls and two strikes. Finally, as can be seen in FIG. 11 count box 10 of the method herein, has all of the horizontally disposed pixelated sections 14 and vertically disposed pixelated sections 16 illuminated and colorized. This mode of the count box 10 signifies that the batter has incurred a full count during a turn at bat.

It will be readily apparent that the various methods of displaying a baseball batter count described herein may be implemented by appropriately programmed general purpose computers and computing devices. For example, a television, computer monitor, tablet, laptop, smartphone or other display typically includes a processor (e.g., a microprocessor) will receive instructions from a memory or like device, and execute those instructions, thereby performing a process defined by those instructions. Further, programs that implement such methods and algorithms may be stored and transmitted using a variety of known media. Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, and 3G.

The baseball batter count display method of the present invention may be embodied in a machine-readable medium that may include, but is not limited to, floppy diskettes, optical disks, CD-ROMs, magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a wired/wireless modem or network connection).

This invention has other applications, potentially, and one skilled in the art could discover these. The explication of the features of this invention does not limit the claims of this application; other applications developed by those skilled in the art will be included in this invention. While all of the fundamental characteristics and features of the baseball batter count box on a video display invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. It is an object of the invention to provide a count box which employs horizontally and vertically depicted areas to signify a number of strikes and balls accrued by a current batter.

What is claimed is:

1. A method for depicting a batter count box on a display, the method comprising the steps of:
    employing a plurality of pixelated sections, with the plurality of pixelated sections including:
    a pixelated balls section arranged horizontally in the batter count box, the pixelated balls section including a first color; and
    a pixelated strikes section arranged vertically in the batter count box, the pixelated strikes section including a second color.

2. The method of claim 1, wherein the count box includes an advertisement.

3. The method of claim 1, wherein the count box includes a logo of a baseball team.

4. The method of claim 1, wherein the plurality of pixelated balls sections and the plurality of pixelated strikes sections are illuminated sequentially to depict a batter count.

5. A method for depicting a batter count box on a display, the method comprising the steps of:
    employing a plurality of pixelated sections, with the plurality of pixelated sections including:
    a pixelated balls section arranged horizontally in the batter count box, the pixelated balls section including a first color; and
    a pixelated strikes section arranged vertically in the batter count box, the pixelated strikes section including a second color.

6. The method of claim 5, wherein the count box comprises an area on the display that includes the plurality of pixelated sections.

7. The method of claim 5, wherein the count box includes an advertisement.

8. The method of claim 5, wherein the count box includes a logo of a baseball team.

9. The method of claim 5, wherein the plurality of pixelated balls sections and the plurality of pixelated strikes sections are illuminated sequentially to depict a batter count.

10. A non-transitory machine readable storage medium having stored thereon a computer program for depicting a batter count box on a display, the computer program comprising a routine of set instructions for causing the machine to perform the steps of:
 employing a plurality of pixelated sections, with the plurality of pixelated sections including:
 a pixelated balls section arranged horizontally in the batter count box, the pixelated balls section including a first color; and
 a pixelated strikes section arranged vertically in the batter count box, the pixelated strikes section including a second color.

11. The method of claim 1, wherein the count box includes an advertisement.

\* \* \* \* \*